United States Patent
Finkelstein et al.

(10) Patent No.: US 7,603,333 B2
(45) Date of Patent: Oct. 13, 2009

(54) DELAYED POLICY EVALUATION

(75) Inventors: Amit Finkelstein, Haifa (IL); Avihai Lifschitz, Bellevue, WA (US); Yosef Dinerstein, Haifa (IL); Ziv Caspi, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 11/454,042

(22) Filed: Jun. 14, 2006

(65) Prior Publication Data

US 2007/0294198 A1    Dec. 20, 2007

(51) Int. Cl.
*G06N 5/02* (2006.01)
*G06F 15/173* (2006.01)
(52) U.S. Cl. .......................... 706/48; 709/225
(58) Field of Classification Search ............. 706/46–48; 709/225
See application file for complete search history.

(56) References Cited

U.S. PATENT DOCUMENTS

| | | | | |
|---|---|---|---|---|
| 6,141,749 A | | 10/2000 | Coss et al. .................. 713/162 |
| 6,154,775 A | * | 11/2000 | Coss et al. .................. 709/225 |
| 6,170,012 B1 | | 1/2001 | Coss et al. .................. 709/229 |
| 6,496,935 B1 | | 12/2002 | Fink et al. .................... 713/201 |
| 6,574,666 B1 | | 6/2003 | Dutta et al. .................. 709/227 |
| 6,832,321 B1 | | 12/2004 | Barrett ........................ 713/201 |
| 7,340,770 B2 | * | 3/2008 | Freund ......................... 726/11 |
| 7,376,969 B1 | * | 5/2008 | Njemanze et al. ............. 726/22 |
| 7,437,763 B2 | * | 10/2008 | Guo ............................ 726/25 |
| 2001/0042202 A1 | | 11/2001 | Horvath et al. ............... 713/154 |
| 2002/0171546 A1 | * | 11/2002 | Evans et al. .................. 340/540 |
| 2003/0233582 A1 | | 12/2003 | Pemmaraju .................. 713/201 |
| 2007/0199060 A1 | * | 8/2007 | Touboul ....................... 726/11 |

OTHER PUBLICATIONS

Hamed, H. et al., "Dynamic Rule-Ordering Optimization for High-Speed Firewall Filtering", *ASIACCS*, 2006, 11 pages, http://www.mnlab.cs.depaul.edu/mnlab/pubs/asiaccs06.pdf.
Ioannidis, S. et al., "Implementing a Distributed Firewall", *CCS*, 2000, 10 pages, http://www.securiteinfo.com/ebooks/palm/ccs-df.pdf.

\* cited by examiner

*Primary Examiner*—David R Vincent
*Assistant Examiner*—Benjamin Buss
(74) *Attorney, Agent, or Firm*—Woodcock Washburn LLP

(57) ABSTRACT

The evaluation of a policy can be delayed until all rules criteria needed for evaluation are available. Also, new types of rules criteria can be registered without requiring changes to a rules engine. A policy manager allows rules to be evaluated and decisions made at different stages of the request handling. The policy manager facilitates interaction with the rules engine until all criteria are evaluated. The policy manager also allows modules developed by third parties to provide notification when criteria can be decided and thus complete evaluation.

14 Claims, 3 Drawing Sheets

DELAYED POLICY EVALUATION

TECHNICAL FIELD

The technical field generally relates to computer-related security and more specifically to policies used to implement computer-related security.

BACKGROUND

Firewalls and other software products that enforce security policies on traffic in computer systems typically provide policy models based on rules. A firewall inspects the traffic passing through it and applies the policy to the traffic. Current rule based systems typically include a fixed set of criteria from which rules can be built that is used to evaluate an access policy. Use of a fixed set of criteria prohibits implementation of new types of criteria. Current rule based systems also restrict rules' criteria to items that can be evaluated only when the policy is evaluated.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A policy manager provides the ability to delay the final evaluation of a policy until all properties needed for criteria resolution are available. The policy manager comprises a generic rules extensibility mechanism that supports a rules engine and allows the addition of new criteria to a policy. The new criteria are opaque to the rules engine, and thus do not require changes to be made to the rules engine. The policy manager defines the way that rules are evaluated in a way that allows the rules engine to function correctly until all criteria needed for final resolution of an evaluation request are resolved. The policy manager provides the ability to evaluate rules criteria at different stages of an evaluation request, and delay final evaluation of rules if not all needed criteria are resolved. If all criteria are resolved, a decision is made, and if appropriate, a corresponding action is called, or the rule is found not matching. In the latter case the rules engine continues evaluation of the policy. If not all criteria are resolved, the final evaluation of the rule is delayed, and the other rules of the policy are evaluated. When all required properties for unresolved criteria are obtained, an unresolved rule is evaluated by the rules engine. In an example embodiment, the first matching rule defines the final result of evaluation.

BRIEF DESCRIPTION OF THE DRAWINGS

The foregoing summary, as well as the following detailed description, are better understood when read in conjunction with the appended drawings. For the purpose of illustrating delayed policy evaluation, there is shown in the drawings exemplary constructions thereof; however, delayed policy evaluation is not limited to the specific methods and instrumentalities disclosed.

DETAILED DESCRIPTION OF ILLUSTRATIVE EMBODIMENTS

A generic rules extensibility mechanism, referred to as a policy manager, provides the ability to register new rule criteria with a rules engine without requiring reimplementation of the entire rules engine. In an example configuration, the policy manager is implemented as an application programming interface (API) extending the capabilities of a rules engine of a firewall. The policy manager allows firewall extension modules, referred to as criteria providers, to add new rules criteria, which are opaque to the policy engine. The policy manager also provides the ability to evaluate rules criteria at different stages of an evaluation request, and delay evaluation of rules if not all required criteria for the evaluation request are resolved. In an example embodiment, rules are evaluated in a predetermined evaluation order. During the evaluation of a rule, if all criteria are resolved by criteria providers, a decision is made about rule matching, and if appropriate, a corresponding action is called, or the next rule is evaluated. If not all criteria are resolved, the rule is marked as unresolved and the other rules in the predetermined order are evaluated. When a criteria provider for unresolved criterion has received the needed information, the criteria provider notifies the policy manager that it is ready, and the rule is reevaluated.

Figure 1:
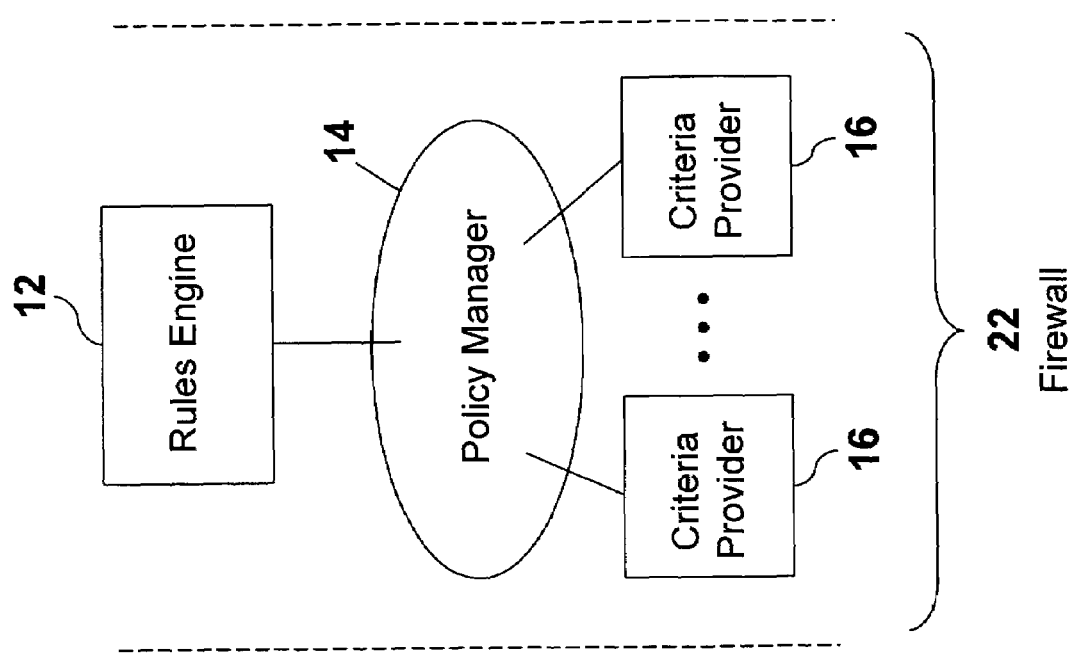
FIG. 1 is an illustration of an example environment in which delayed policy evaluation can be implemented.

FIG. 1 is an illustration of an example environment in which policy evaluation delay can be implemented. The policy manager 14 interfaces with the rules engine 12 and various criteria providers 16 to evaluate policies for controlling traffic. The rules engine 12 of the firewall 22 enforces security policies on the traffic. The firewall provides policies based on rules. Each rule is evaluated dependent upon specific criteria. Different criteria can be evaluated at different stages of the processing of the traffic. For example the source IP and exact time of an HTTP (Hypertext Transfer Protocol) request are known immediately when a TCP (Transmission Control Protocol) connection is established, but the URL that is requested is not known until HTTP headers of the request have arrived. Each criteria provider 16 evaluates criteria to make decisions for different rules. Each criteria provider 16 provides a decision to the rules engine 12 via the policy manager 14. For example, a rule could check for specific character values at specific location in the message traffic to detect a specific type of virus. A criteria provider 16 evaluates criteria and provides a decision via the policy manager 14 to the rules engine 12. The rules engine 12 either allows traffic to traverse the firewall 22, conditionally allows traffic to traverse the firewall 22, or denies traffic traversal, in accordance with the decision provided.

The policy manager 14 allows the addition of criteria providers 16 for adding rule criteria that are matched in different stages of a request. In an example embodiment, the policy manager 14 is implemented as an application programming interface (API) that allows firewall extension modules to provide the outcome of a specific criterion via the criteria providers 16. The policy manager 14 also allows the criteria providers 16 to interact with the rules engine 12 to receive notification when a certain evaluation is required and to notify the rules engine 12 when an evaluation is complete. Evaluation is not restricted to a specific point in the processing. Rule engine 12 marks criteria as unresolved if not all criteria needed for a rule are resolved. When a criteria provider 16 has accumulated the needed information for the evaluation request, it evaluates the criterion, and notifies the rules engine 12, via the policy manager 14, that evaluation is complete.

Figure 2:
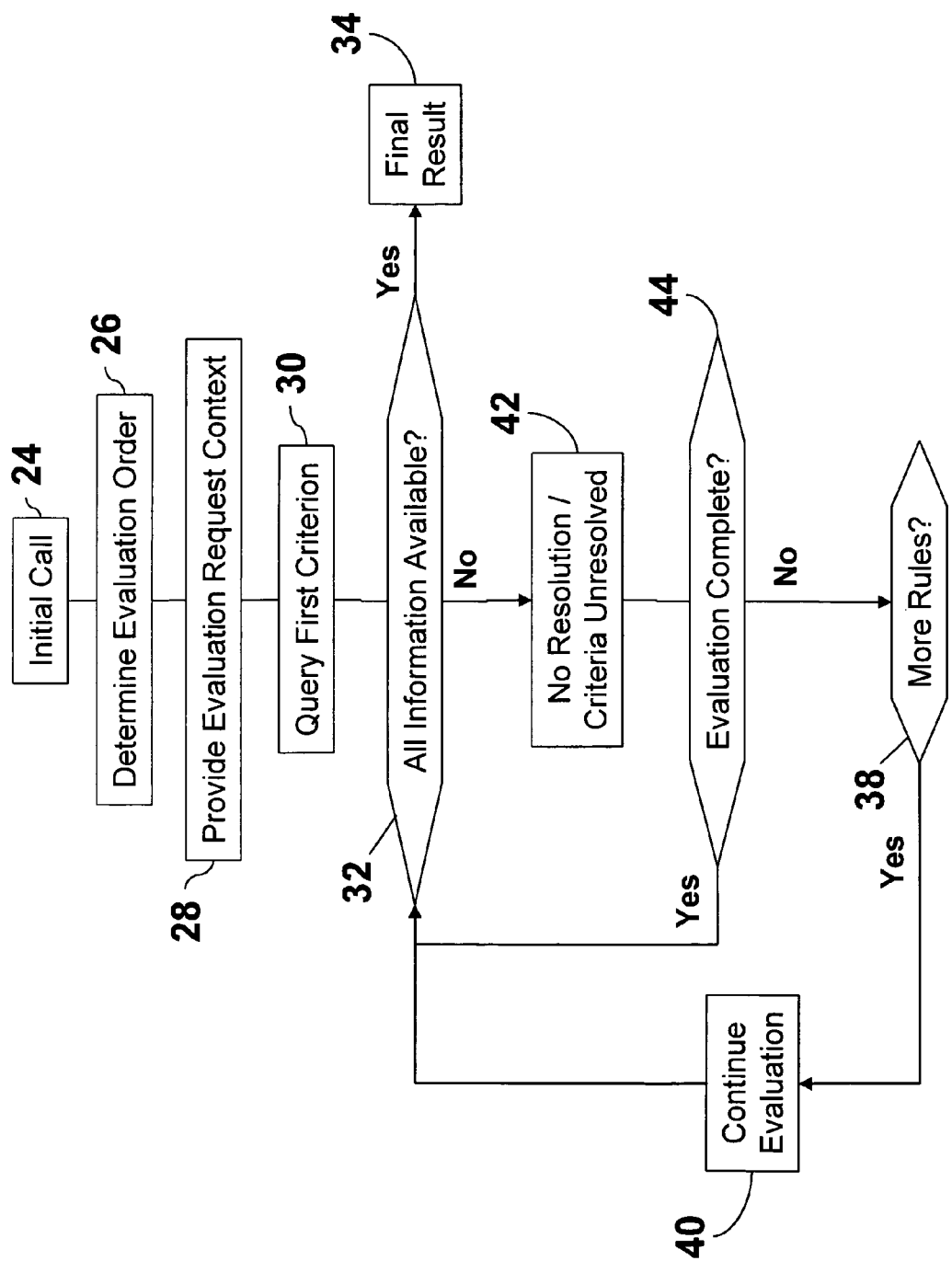
FIG. 2 is a flow diagram of an example process for evaluating a delayed policy.

FIG. 2 is a flow diagram of an example process for evaluating a delayed policy. A call is initiated to the rules engine at step 24. The initial call comprises initial information, which may or may not comprise all criteria needed for evaluation of a rule. The order in which to analyze criteria is determined at step 26. The rules engine calls the criteria providers according to the predetermined evaluation order. At step 28, the rules engine provides to the criteria providers an evaluation request context to allow each criteria provider to fetch required properties and to provide the rules engine, via the policy manager, a match\no match decision. In an example embodiment, some criteria providers are called in advance of when their evaluation is required. That is, the rules engine will call, via the policy manager, all criteria providers that their respective evaluations will be needed, even though the criteria needed by rules engine has not reached and will not reach the criteria provider until a later point in the request evaluation. Thus, a criterion can be evaluated when another criterion in the predetermined evaluation order was not resolved.

The first criterion in the predetermined evaluation ordered is queried at step 30. The query can be in the form of a call to the criteria provider. The rules engine requests, via the policy manager, the first criteria provider in the predetermined evaluation order to provide a decision for the criterion. The criteria provider fetches properties of the evaluation request and can look at the existing traffic to match them against the condition of the criterion. If all required information is available (step 32), the criteria provider returns the final result (step 34) of matching or not matching to the rules engine. For example, if a specific criteria provider's respective rule was to check for a particular virus, and the evaluation of the criteria indicated that no virus was found, this would be passed on to the rules engine, via the policy manager. Accordingly, traffic could be allowed to traverse the firewall.

If some properties of the evaluation request that are required by the criteria provider to evaluate a criterion are not yet known (step 32), the criteria provider returns to the rules engine stating (step 42) that there is no resolution for the criterion yet, and that the criteria is unresolved.

If evaluation of a rule was not final (step 44), it is determined if more rules are to be evaluated at step 38. If there are more rules to be evaluated (step 38), the rules engine continues to evaluate the rules (step 40) to allow criteria providers for those rules to be called. This is advantageous because the rule that was not resolved, but might later be found not matching and the following rules will provide the final result of the evaluation. Calling to criteria providers for criteria of those rules provide criteria providers the ability to take necessary actions to be able to evaluate those rules later. If evaluation of a rule is final (step 44), the process proceeds to step 32.

As evident from the example process depicted in FIG. 2, the rules engine will try to resolve each criterion by calling it's criteria provider via the policy manager. Unresolved criteria (step 42) will be revisited (called/queried again) until the rule is matched entirely, or the evaluation of the rule is not longer needed. If the evaluation of the criteria provider/rule is not longer needed, the querying of the criteria provider is ceased. If the evaluation is no longer needed, the criteria provider is sent a cancellation notice. The cancellation notice is sent from the rules engine via the policy manger. The criteria provider will then discontinue consumption of resources. A criteria provider could be sent a cancellation notice, for example, when an operator is shutdown, or when another criteria provider has completed its evaluation in a way the makes another criteria provider's evaluation obsolete.

Figure 3:
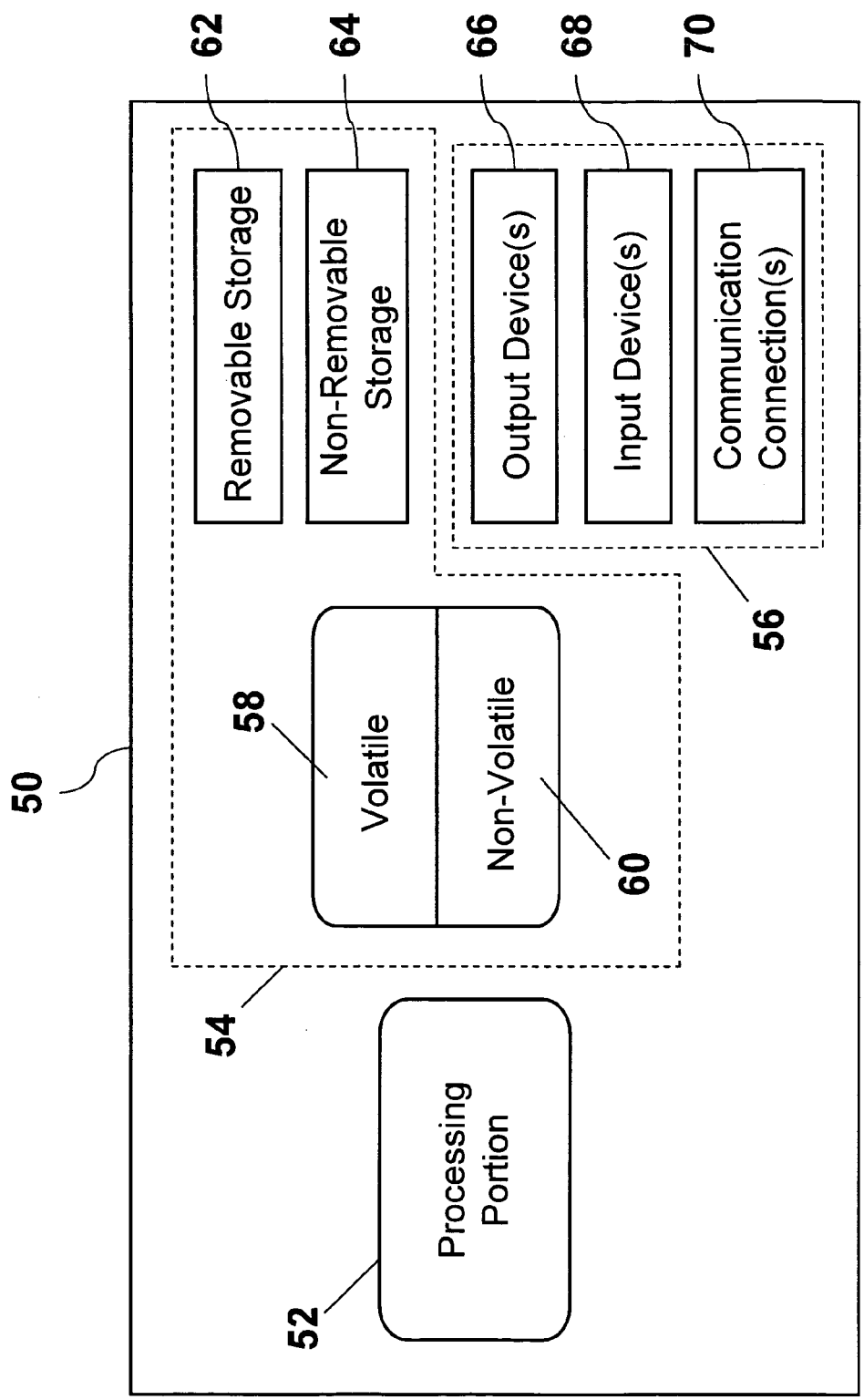
FIG. 3 is a diagram of an exemplary computing device for implementing delayed policy evaluation.

FIG. 3 is a diagram of an exemplary computing device 52 for implementing delayed policy evaluation. The computing device 50 can be implemented as a client processor and/or a server processor. For example, the rules engine, the policy manager, and the criteria providers can be implemented on a single computing device 50. In other example embodiments, the rules engine, the policy manager, and the criteria providers are distributed in any combination over multiple computing devices 50. The computing device 50 comprises a processing portion 52, a memory portion 54, and an input/output portion 56. The processing portion 52, memory portion 54, and input/output portion 56 are coupled together (coupling not shown in FIG. 3) to allow communications therebetween. The computing device 50 is capable of performing the operations associated with implementing delayed policy evaluation. For example, the processing portion 52 is capable of performing functions of the rules engine, the policy manager, the criteria provider, or any combination thereof. The processing portion 52 can initiate a call to the rules engine, can manage the interaction between the criteria providers and the rules engine, can determine the order of evaluation of the criteria, can determine if all criteria for a rule are resolved, can determine if more criteria are to be evaluated, including unresolved criteria and criteria remaining on the predetermined evaluation order, can partially evaluate a rule, can mark a criteria as unresolved, can call an appropriate action, can decide the outcome of a rule in accordance with the provided criteria, or a combination thereof, as described above for example. The memory portion 54 is capable of storing all parameters associated with implementing delayed policies, such as information pertaining to the status of a criterion (resolved or unresolved), intermediate results of an evaluation, decisions resulting from an evaluation, or a combination thereof, for example.

The input/output portion 56 is capable of providing and/or receiving data, as describe above, utilized to implement delayed policies. The input/output portion 56 can provide data to and receive data from another computing device, a storage device, a criteria provider, a rules engine, a policy manager, a network, or any combination thereof, for example. For example, the computing device 50 could be implemented in a firewall and the input/output portion 56 would be for receiving criteria from networks and providing/receiving traffic to/from networks in communication with the firewall.

Depending upon the exact configuration and type of processor, the memory portion 54 can be volatile (such as RAM and/or cache) 58, non-volatile (such as ROM, flash memory, etc.) 60, or a combination thereof. The computing device 50 can have additional features/functionality. For example, the computing device 50 can include additional storage (removable storage 62 and/or non-removable storage 64) including, but not limited to, magnetic or optical disks, tape, flash, smart cards or a combination thereof. Computer storage media, such as memory portion 54, 58, 60, 62, and 64, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the computing device 50. Any such computer storage media can be part of the computing device 50.

The computing device 50 also can contain communications connection(s) 70 that allow the computing device 50 to communicate with other devices. Communications connection(s) 70 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The computing device 50 also can have input device(s) 68 such as keyboard, mouse, pen, voice input device, touch input device, etc. Output device(s) 66 such as a display, speakers, printer, etc. also can be included.

While it is envisioned that numerous embodiments of delayed policy evaluation are particularly well-suited for computerized systems, nothing in this document is intended to limit the scope thereof. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing delayed policy evaluation, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing delayed policy evaluation.

The program(s) can be implemented in assembly or machine language, if desired. In any case, the language can be a compiled or interpreted language, and combined with hardware implementations. The methods and apparatuses for delayed policy evaluation also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing delayed policy evaluation. When implemented on a general-purpose processor, the program code combines with the processor to provide a unique apparatus that operates to invoke the functionality of delayed policy evaluation. Additionally, any storage techniques used in connection with delayed policy evaluation can invariably be a combination of hardware and software.

While delayed policy evaluation has been described in connection with the example embodiments of the various figures, it is to be understood that other similar embodiments can be used or modifications and additions can be made to the described embodiments for performing the same functions for implementing delayed policy evaluation without deviating therefrom. Therefore, delayed policy evaluation as described herein should not be limited to any single embodiment, but rather should be construed in breadth and scope in accordance with the appended claims.

What is claimed:

1. A processor-implemented method for communicating between a rules engine implemented in a firewall and a plurality of criteria providers, the method comprising:
   (a) determining, via the processor, the plurality of criteria providers, wherein each criteria provider of the plurality is for resolving a respective criterion of a rule;
   (b) providing a call from the rules engine to each criteria provider of the plurality of criteria providers for information indicative of a criterion evaluation of a received evaluation request by a respective criteria provider, wherein:
      if the received evaluation request is adequate for completing the evaluation of the criterion by the respective criteria provider, providing the called for information from the respective criteria provider to the rules engine; and
      if the received evaluation request is not adequate for completing the evaluation of the criterion by the respective criteria provider, marking the respective criterion as unresolved;
   (c) repeating step (b) for each unresolved criterion, wherein if the received evaluation request by an unresolved criterion is adequate for completing the evaluation by the respective pending criteria provider, the called for information is provided to the rules engine and the unresolved criterion is no longer unresolved.

2. A method in accordance with claim 1, further comprising:
   if an evaluation of unresolved criterion is no longer needed, ceasing providing the call to the respective criteria provider.

3. A method in accordance with claim 1, further comprising registering new criteria providers without requiring a change to the rules engine.

4. A method in accordance with claim 1, further comprising:
   receiving from a one criteria provider, a notification indicative of an evaluation thereby being complete;
   responsive to the notification, providing an indication of the notification to the rules engine; and
   providing the called for information from the one criteria provider to the rules engine.

5. A method in accordance with claim 1, wherein:
   the rules engine is implemented in a firewall;
   a policy is enforced by the rules engine; and
   the plurality of criteria providers is determined in accordance with the policy enforced by the rules engine of the firewall.

6. A system comprising:
   a processor;
   a rules engine, implemented on the processor, that determines a plurality of criteria providers to enforce a policy, wherein each criterion of the plurality is associated with a respective criteria provider; and
   the plurality of criteria providers, each criteria provider:
      evaluating a respective criterion of a rule;
      determining if criteria received thereby is adequate for completing a respective evaluation;
      providing a notification indicative of the adequacy of the received criteria; and making a decision in accordance with the respective evaluation; and a policy manger:
: providing a call from the rules engine to each criteria provider of the plurality for information indicative of an evaluation of criteria received thereby;
: if criteria received by a criteria provider is adequate for completing a respective evaluation, providing the called for information from the respective criteria provider to the rules engine;
: if the criteria received by a criteria provider is not adequate for completing the evaluation, marking the respective criterion as unresolved; and
: for each unresolved criterion, providing a call from the rules engine to each criteria provider of the plurality for information indicative of an evaluation of criteria received thereby wherein, if the received criteria is adequate for completing the evaluation by the respective criteria provider, the queried for information is provided to the rules engine and the unresolved criterion no longer unresolved.

7. A system in accordance with claim 6, the rules engine further determining an appropriate action in accordance with information provided by at least one of the plurality of criteria providers.

8. A system in accordance with claim 6, the policy manager further:
: if an evaluation of a specific unresolved criterion is no longer needed, ceasing providing a call to the specific criteria provider.

9. A system in accordance with claim 6, the policy manager further registering new criteria providers without requiring a change in the rules engine.

10. A system in accordance with claim 6, wherein the rules engine is implemented in a firewall.

11. A system in accordance with claim 6, the policy manager further:
: receiving from a one criteria provider, a notification indicative of an evaluation thereby being complete;
: responsive to the notification, providing an indication of the notification to the rules engine; and
: providing the called for information from the one criteria provider to the rules engine.

12. A processor-implemented method for evaluating a criteria provider, the method comprising:
: (a) determining, via the processor, a plurality of criteria providers, wherein each criteria provider of the plurality is for resolving a respective criterion of a rule;
: (b) querying each criteria provider of the plurality for information of a criterion evaluation of a received evaluation request by a respective criteria provider, wherein:
:: if the received evaluation request is adequate for completing the evaluation of the criterion by the respective criteria provider, providing the queried for information; and
:: if the received evaluation request is not adequate for completing the evaluation of the criterion by the respective criteria provider, marking the respective criterion as unresolved; and
: (c) repeating step (b) for each unresolved criterion, wherein if the received evaluation request by an unresolved criterion is adequate for completing the evaluation by the respective pending criteria provider, the called for information is provided to the rules engine and the unresolved criterion is no longer unresolved.

13. A method in accordance with claim 12, further comprising:
: if an evaluation of unresolved criterion is no longer needed, ceasing querying of the specific criteria provider.

14. A method in accordance with claim 12, further comprising:
: receiving from a one criteria provider, a notification indicative of an evaluation thereby being complete; and
: responsive to the notification, providing the queried for information from the one criteria provider.

* * * * *